United States Patent
Nakagawa

(10) Patent No.: US 10,963,054 B2
(45) Date of Patent: Mar. 30, 2021

(54) INFORMATION PROCESSING SYSTEM, VIBRATION CONTROL METHOD AND PROGRAM

(71) Applicant: Sony Interactive Entertainment Inc., Tokyo (JP)

(72) Inventor: Yusuke Nakagawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 9 days.

(21) Appl. No.: 16/344,148

(22) PCT Filed: Dec. 7, 2017

(86) PCT No.: PCT/JP2017/044073
§ 371 (c)(1),
(2) Date: Apr. 23, 2019

(87) PCT Pub. No.: WO2018/110433
PCT Pub. Date: Jun. 21, 2018

(65) Prior Publication Data
US 2019/0332174 A1 Oct. 31, 2019

(30) Foreign Application Priority Data
Dec. 15, 2016 (JP) .............................. JP2016-243640

(51) Int. Cl.
*G06F 3/01* (2006.01)
*A63F 13/215* (2014.01)
(Continued)

(52) U.S. Cl.
CPC ............ *G06F 3/016* (2013.01); *A63F 13/215* (2014.09); *A63F 13/22* (2014.09); *A63F 13/285* (2014.09);
(Continued)

(58) Field of Classification Search
USPC ...................................................... 704/1–504
See application file for complete search history.

(56) References Cited

U.S. PATENT DOCUMENTS

| | | | |
|---|---|---|---|
| 5,889,670 A | 3/1999 | Schuler | |
| 6,766,299 B1 * | 7/2004 | Bellomo | ................. G10L 21/06 704/276 |

(Continued)

FOREIGN PATENT DOCUMENTS

| | | |
|---|---|---|
| EP | 0999518 A1 | 5/2000 |
| JP | 0884858 A | 4/1996 |

(Continued)

OTHER PUBLICATIONS

Office Action for related U.S. Appl. No. 16/500,651, 7 pages, dated Apr. 16, 2020.

(Continued)

*Primary Examiner* — Marcus T Riley
(74) *Attorney, Agent, or Firm* — Matthew B. Dernier, Esq.

(57) ABSTRACT

In an information processing system including a controller device including at least one vibration body, and an information processing apparatus outputting a control signal for the vibration body to the controller device, in vibration of the vibration body, sounds of the periphery are collected, and it is decided whether or not an allophone is generated in the controller device by using a signal of the collected sounds. When it is decided that the allophone is generated in the controller device, the information processing apparatus executes correction processing for the control signal for the vibration body, and outputs the control signal corrected by the correction processing.

7 Claims, 6 Drawing Sheets

US 10,963,054 B2

Page 2

(51) Int. Cl.
  *A63F 13/22* (2014.01)
  *A63F 13/285* (2014.01)
  *G10L 15/02* (2006.01)

(52) U.S. Cl.
  CPC ...... *G10L 15/02* (2013.01); *A63F 2300/1018* (2013.01); *A63F 2300/1081* (2013.01); *A63F 2300/302* (2013.01); *G10L 2015/025* (2013.01)

(56) References Cited

U.S. PATENT DOCUMENTS

| | | | |
|---|---|---|---|
| 6,864,877 B2 | 3/2005 | Braun | |
| 7,010,488 B2* | 3/2006 | van Santen | G10L 13/04 |
| | | | 704/258 |
| 7,218,310 B2 | 5/2007 | Goldenberg | |
| 8,248,218 B2 | 8/2012 | Yamaya | |
| 8,249,276 B2* | 8/2012 | Hamada | A63F 13/10 |
| | | | 381/99 |
| 8,325,144 B1 | 12/2012 | Tierling | |
| 8,487,759 B2 | 7/2013 | Hill | |
| 8,727,878 B2* | 5/2014 | Longdale | A63F 13/06 |
| | | | 463/32 |
| 8,787,586 B2* | 7/2014 | Hamada | H04S 7/30 |
| | | | 381/63 |
| 9,007,445 B2 | 4/2015 | Oikawa | |
| 9,070,282 B2* | 6/2015 | Clough | H04W 88/08 |
| 9,098,984 B2 | 8/2015 | Heubel | |
| 9,135,791 B2 | 9/2015 | Nakamura | |
| 9,430,700 B2 | 8/2016 | Yagcioglu | |
| 9,436,280 B2 | 9/2016 | Tartz | |
| 9,542,745 B2 | 1/2017 | Moteki | |
| 9,630,098 B2 | 4/2017 | Mikhailov | |
| 9,753,537 B2 | 9/2017 | Obana | |
| 9,792,501 B1 | 10/2017 | Maheriya | |
| 9,846,484 B2 | 12/2017 | Shah | |
| 9,940,716 B2 | 4/2018 | Chevassus | |
| 9,946,347 B2 | 4/2018 | Nakagawa | |
| 9,952,670 B2 | 4/2018 | Watanabe | |
| 9,983,671 B2 | 5/2018 | Adachi | |
| 10,109,161 B2 | 10/2018 | Shah | |
| 10,150,029 B2 | 12/2018 | Yamano | |
| 10,175,761 B2 | 1/2019 | Cruz-Hernandez | |
| 10,347,093 B2 | 7/2019 | Rihn | |
| 10,394,326 B2 | 8/2019 | Ono | |
| 10,444,837 B2 | 10/2019 | Takeda | |
| 2002/0030663 A1 | 3/2002 | Goldenberg | |
| 2002/0080112 A1 | 6/2002 | Braun | |
| 2002/0163498 A1 | 11/2002 | Chang | |
| 2003/0030619 A1 | 2/2003 | Martin | |
| 2003/0212555 A1* | 11/2003 | van Santen | G10L 13/04 |
| | | | 704/241 |
| 2004/0220812 A1* | 11/2004 | Bellomo | G10L 21/06 |
| | | | 704/275 |
| 2005/0134562 A1 | 6/2005 | Grant | |
| 2007/0091063 A1 | 4/2007 | Nakamura | |
| 2007/0248235 A1* | 10/2007 | Hamada | A63F 13/24 |
| | | | 381/99 |
| 2008/0204266 A1 | 8/2008 | Malmberg | |
| 2008/0262658 A1 | 10/2008 | Ding | |
| 2009/0017911 A1 | 1/2009 | Miyazaki | |
| 2010/0016077 A1* | 1/2010 | Longdale | A63F 13/214 |
| | | | 463/37 |
| 2010/0085462 A1 | 4/2010 | Sako | |
| 2010/0090815 A1 | 4/2010 | Yamaya | |
| 2010/0091096 A1 | 4/2010 | Oikawa | |
| 2010/0245237 A1 | 9/2010 | Nakamura | |
| 2011/0039606 A1 | 2/2011 | Kim | |
| 2011/0075835 A1 | 3/2011 | Hill | |
| 2011/0163946 A1 | 7/2011 | Tartz | |
| 2012/0232780 A1 | 9/2012 | Delson | |
| 2012/0281849 A1* | 11/2012 | Hamada | A63F 13/235 |
| | | | 381/63 |
| 2013/0057509 A1 | 3/2013 | Cruz-Hernandez | |
| 2013/0250502 A1 | 9/2013 | Tossavainen | |
| 2013/0261811 A1 | 10/2013 | Yagi | |
| 2014/0169795 A1* | 6/2014 | Clough | G06F 19/3418 |
| | | | 398/106 |
| 2014/0176415 A1 | 6/2014 | Buuck | |
| 2014/0212000 A1 | 7/2014 | Yagcioglu | |
| 2014/0220520 A1* | 8/2014 | Salamini | A61B 5/7455 |
| | | | 434/185 |
| 2014/0266644 A1 | 9/2014 | Heubel | |
| 2014/0361956 A1 | 12/2014 | Mikhailov | |
| 2015/0042484 A1 | 2/2015 | Bansal | |
| 2015/0059086 A1* | 3/2015 | Clough | G08C 17/02 |
| | | | 5/83.1 |
| 2015/0070261 A1 | 3/2015 | Saboune | |
| 2015/0243016 A1 | 8/2015 | Moteki | |
| 2015/0273322 A1 | 10/2015 | Nakagawa | |
| 2015/0297990 A1 | 10/2015 | Mahlmeister | |
| 2015/0302854 A1* | 10/2015 | Clough | G06F 19/3418 |
| | | | 704/275 |
| 2015/0323996 A1 | 11/2015 | Obana | |
| 2015/0339819 A1 | 11/2015 | Chevassus | |
| 2016/0012687 A1 | 1/2016 | Obana | |
| 2016/0054797 A1 | 2/2016 | Tokubo | |
| 2016/0124707 A1 | 5/2016 | Ermilov | |
| 2016/0132117 A1 | 5/2016 | Yusuke Asachi | |
| 2016/0162025 A1 | 6/2016 | Shah | |
| 2016/0214007 A1 | 7/2016 | Yamashita | |
| 2016/0310844 A1 | 10/2016 | Yamashita | |
| 2016/0342213 A1 | 11/2016 | Endo | |
| 2017/0038841 A1 | 2/2017 | Takeda | |
| 2017/0045991 A1 | 2/2017 | Watanabe | |
| 2017/0053502 A1 | 2/2017 | Shah | |
| 2017/0061784 A1* | 3/2017 | Clough | G06F 3/0482 |
| 2017/0092084 A1 | 3/2017 | Rihn | |
| 2017/0097681 A1 | 4/2017 | Ono | |
| 2017/0205883 A1 | 7/2017 | Tanaka | |
| 2017/0235364 A1 | 8/2017 | Nakamura | |
| 2017/0242486 A1 | 8/2017 | Grant | |
| 2018/0067313 A1 | 3/2018 | Sako | |
| 2018/0098583 A1 | 4/2018 | Keller | |
| 2018/0203509 A1 | 7/2018 | Yamano | |
| 2019/0105563 A1 | 4/2019 | Yamano | |
| 2019/0332174 A1* | 10/2019 | Nakagawa | G06F 3/016 |
| 2019/0334426 A1 | 10/2019 | Culbertson | |
| 2019/0369730 A1 | 12/2019 | Marchant | |
| 2020/0225755 A1* | 7/2020 | Lee | G06F 3/016 |
| 2020/0359687 A1 | 11/2020 | Scatterday | |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2010038707 A | 2/2010 |
| JP | 2010092436 A | 4/2010 |
| JP | 2011501296 A | 1/2011 |
| JP | 2011183374 A | 9/2011 |
| JP | 2012103852 | 5/2012 |
| JP | 2012226482 A | 11/2012 |
| JP | 2013507059 A | 2/2013 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A1 | 10/2014 |
| JP | 2015053038 A | 3/2015 |
| JP | 2015513143 A | 4/2015 |
| JP | 2015118605 A | 6/2015 |

(56) References Cited

FOREIGN PATENT DOCUMENTS

| | | |
|---|---|---|
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| JP | 20170440751 A | 6/2019 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
International Search Report for related PCT Application No. PCT/JP2017/044074, 4 pages, dated Jan. 16, 2018.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Preliminary Report on Patentability and Written Opinion for related PCT Application No. PCTJP2017044074, 12 pages, dated Jun. 18, 2019.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for related PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
International Preliminary Report on Patentability and Written Opinion for related application PCT/JP2017/016552, 13 pages, dated Nov. 7, 2019.
International Search Report for related application PCT/JP2018/026551, 4 pages, dated Aug. 7, 2018.
International Preliminary Report on Patentability and Written Opinion for related PCT Application No. PCT/JP2017/01556, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Notice of Reasons for Refusal for corresponding JP Application No. 2019513214, 12 pages, dated Apr. 28, 2020.
Office Action for related U.S Appl. No. 16/345,071, 10 pages, dated Feb. 19, 2020.
International Search Report for related PCT Application No. PCT/JP2017/030344, 4 pages, dated Oct. 10, 2017.
International Preliminary Report on Patentability and Written Opinion for corresponding PCT Application No. PCT/JP2017/044073, 10 pages, dated Jun. 27, 2019.
International Search Report for correspodning PCT Application No. PCT/JP2017/044073, 2 pages, dated Jan. 23, 2018.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
Notice of Reasons for Refusal for corresponding JP Application No. 2019-537506, 4 pages, dated Nov. 18, 2020.
Decision to Grant for related JP Application No. JP2019-513523, 5 pages, dated Dec. 24, 2020.
Notice of Reasons for Refusal for related JP Application No. JP2019-537507, 8 pages, dated Dec. 14, 2020.

\* cited by examiner

INFORMATION PROCESSING SYSTEM, VIBRATION CONTROL METHOD AND PROGRAM

TECHNICAL FIELD

The present invention relates to an information processing system, a vibration control method, and a program.

BACKGROUND ART

Like a controller device which is connected to an information processing apparatus such as a home video game console to be used, some controller devices which are used by a user with the controller device attached to or held in the user's body are provided with a vibration mechanism for vibrating part or all of the controller device. The information processing apparatus such as the home video game console outputs waveform information representing a temporal change of a vibration amplitude to such a vibration mechanism to cause the vibration mechanism to perform vibration based on the corresponding waveform information. As a result, the controller device can be vibrated at an arbitrary timing to present the vibration to the user.

SUMMARY

Technical Problems

However, a period of the vibration matches with a natural frequency of a chassis or the like with which the controller device is provided, or an object (a disk or the like) with which the chassis is in contact, causing a resonance sound to be generated, depending on the outputted waveform information, in some cases. In addition, when the vibration mechanism is one such as a linear actuator which generates vibration by moving a position of a weight, for example, the weight is previously moved in a vibration direction by an influence of the gravity depending on a posture of the controller device, in some cases. When vibration is started from the position after the movement, the weight hits an exterior or the like of the vibration mechanism to generate a mechanical hitting sound of ticktock, in some cases.

Rumbling of an unintentional sound (hereinafter, referred to as an allophone) following such a vibration presents an unintentional feeling to the user, and is unfavorable for the user, in some cases.

The present invention has been made in the light of the actual situation described above, and it is therefore one of objects of the present invention to provide an information processing system, a vibration control method, and a program each of which enables generation of an allophone following vibration to be suppressed.

Solution to Problems

According to the present invention solving the problems of the related example described above, there is provided an information processing system including a controller device including at least one vibration body, and an information processing apparatus outputting a control signal for the vibration body to the controller device, the information processing system including detection means detecting a vibration state of the controller device in vibration of the vibration body, and decision means deciding whether or not an allophone is generated in the controller device by using information representing the detected vibration state, in which, when it is decided that the allophone is generated in the controller device, the information processing apparatus executes correction processing for the control signal for the vibration body, and outputs a control signal corrected by the correction processing.

Advantageous Effect of Invention

According to the present invention, generation of an allophone following vibration can be suppressed.

DESCRIPTION OF EMBODIMENTS

An embodiment of the present invention will be described with reference to drawings. It should be noted that in the following description, a size and a ratio thereof, an arrangement, and the like of each section is an example, and the embodiment is by no means limited to the size, the ratio, and the arrangement of each section depicted.

An information processing system 1 according to an example of an embodiment of the present invention includes an information processing apparatus 10, and a controller device 20. Here, the information processing apparatus 10, for example, is a computer apparatus such as a home video game console, and the controller device 20 is connected to the information processing apparatus 10.

The controller device 20 according to the embodiment of the present invention is mounted in a left hand or a right hand of a user to be fixed thereto. In the following description, in a case in which the controller device 20 fixed to the left hand of the user and the controller device 20 fixed to the right hand of the user need to be distinguished from each other, the controller device 20 fixed to the left hand of the user is expressed by the controller device 20L, and the controller device 20 fixed to the right hand of the user is expressed by the controller device 20R. In such a manner, the reference signs L and R are respectively added to the controller devices 20, thereby distinguishing those controller devices 20L and 20R from each other.

Figure 1:
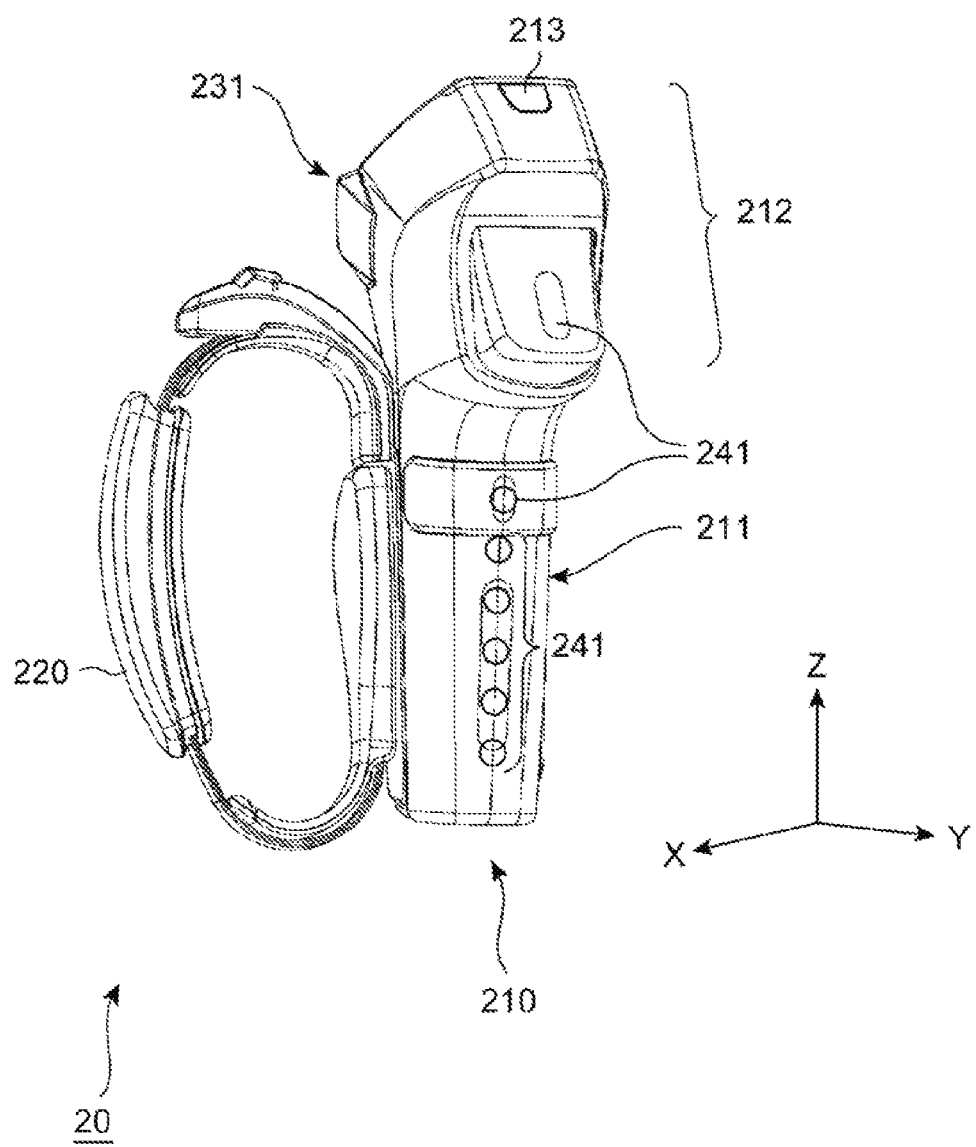
FIG. 1 is a schematic perspective view representing an example of a controller device according to an embodiment of the present invention.
Figure 2:
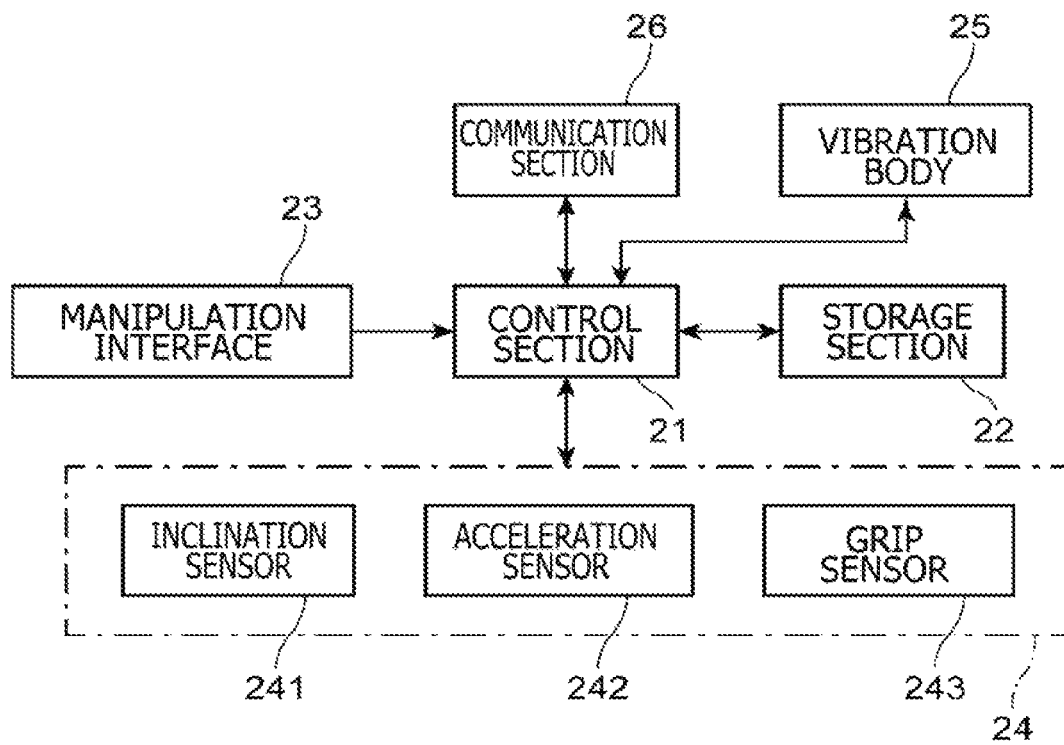
FIG. 2 is a configuration block diagram representing an example of a circuit section of the controller device according to the embodiment of the present invention.

An example of the controller device 20, as outline thereof is exemplified in FIG. 1, includes a device main body 210, and a fixture 220 fixed to the device main body 210. In addition, the controller device 20 includes a circuit section, as depicted in FIG. 2, including a control section 21, a storage section 22, a manipulation interface 23, a sensor section 24, a vibration body 25, and a communication section 26 within the device main body 210.

With respect to the device main body 210, the device main body 210 which is to be mounted in the left hand of the user, and the device main body 210 which is to be mounted in the right hand of the user may be identical in shape to each other. In the example of the present embodiment, it is assumed that the fixture 220, for example, has a flexible belt and a buckle, and an annular section which is adjustable in diameter thereof is formed by the belt and the buckle. Then, the user makes the index finger to the little finger pass through the annular section, and suitably adjusts the diameter of the annular section in such a way that the device main body 210 is fixed to a position where the device main body 210 is brought into contact with the base of the thumb of the user (a position corresponding to an MP joint of the index finger to the little finger), and fixes the hand of the user to the device main body 210 with the buckle.

The device main body 210 includes a grip section 211 which is griped by the user, a manipulation section 212, and a position presenting section 213. In an example of the present embodiment, the grip section 211 has a substantially polygonal columnar shape. The manipulation section 212 is formed continuously from the grip section 211, and in the example of FIG. 1, includes a button manipulation section 231.

The position presenting section 213 is arranged on a back surface of an upper side (when being fixed to the hand of the user, the thumb finger side) of the device main body 210, and includes at least one light emitting element such as an LED, for example. The position presenting section 213 shall emit light of a color previously specified, which is inherent to each controller device 20 during operation of the controller device 20. In addition, the position presenting section 213 may be a marker or the like of a color inherent to each controller device 20 as long as a position of each of the controller devices 20 can be detected externally, and thus, the position presenting section 213 may not be necessarily the light emitting element.

In addition, the size of the controller device 20 is configured such that, when the user naturally grips the device main body 210, one end thereof is slightly located outside with respect to a position where the tip of the thumb of the user reaches, and the other end thereof is located in a position slightly protruding from the base of the little finger (a position corresponding to the MP joint). Incidentally, even if the user opens the hand in a state in which the controller device 20 is mounted in the hand of the user, since the controller device 20 is fixed to the hand of the user by the fixture 220, the controller device 20 does not fall.

The control section 21 of the embodiment is a program-controlled device such as a CPU, and operates in accordance with a program stored in the storage section 22. In the present embodiment, the control section 21 receives an input of information representing contents of the manipulation performed in the manipulation section 212 by the user from the manipulation interface 23, and outputs the corresponding information representing the contents of the manipulation to the information processing apparatus 10 through the communication section 26. In addition, the control section 21 outputs information which is outputted from the sensor included in the sensor section 24 to the information processing apparatus 10 through the communication section 26.

The storage section 22 is a memory device or the like, and holds therein the program which is to be executed by the control section 21. The program may be stored in a computer-readable and non-temporary storage medium to be provided, and may be copied to the storage section 22. In addition, the storage section 22 operates also as a work memory of the control section 21.

The manipulation interface 23 outputs the information representing the contents of the manipulation performed in the manipulation section 212 by the user to the control section 21. The sensor section 24 includes at least one sensor, and outputs information outputted from the sensor to the control section 21. In an example of the present embodiment, the sensor section 24 includes an inclination sensor 241 detecting an inclination of the device main body 210 of the controller device 20, and an acceleration sensor 242 detecting a movement of the controller device 20. Moreover, the sensor section 24 may include a grip sensor 243.

Here, the axes are previously decided in such a way that a longitudinal direction of the controller device 20 is set as a Z-axis, a direction in which the finger of the user is to be located within a plane in which the Z-axis is set as a normal is set as an X-axis, a direction perpendicular to the X-axis within the plane described above is set as a Y-axis, and so forth. Then, the inclination sensor 241 detects information associated with angles of rotation about the X, Y, and Z axes described above of the device main body 210, and outputs the information. The acceleration sensor 242 detects accelerations, in the direction of the X, Y, and Z axes described above, which are applied to the controller device 20, and outputs the result of the detection.

In response to an input of a waveform information representing a temporal change of a vibration amplitude as a control signal from the control section 21, the vibration body 25 vibrates based on the instructed waveform information. In the present embodiment, the vibration body 25 is a linear actuator, a vibrator obtaining vibration by rotating an eccentric weight, a speaker, or the like. The vibration body may be one which vibrates the device main body 210 in one axis direction, or may be one which vibrates the device main body 210 in multiple directions by, for example, being provided with a plurality of linear actuators in multiaxis directions. In addition, in the present embodiment, the controller device 20 may be provided with a plurality of vibration bodies 25 within the device main body 210.

The communication section 26 is a wired interface such as a USB interface, or a wireless interface such as Bluetooth (registered trademark), and outputs various pieces of information to the information processing apparatus 10 in accordance with an instruction inputted thereto from the control section 21.

Figure 3:
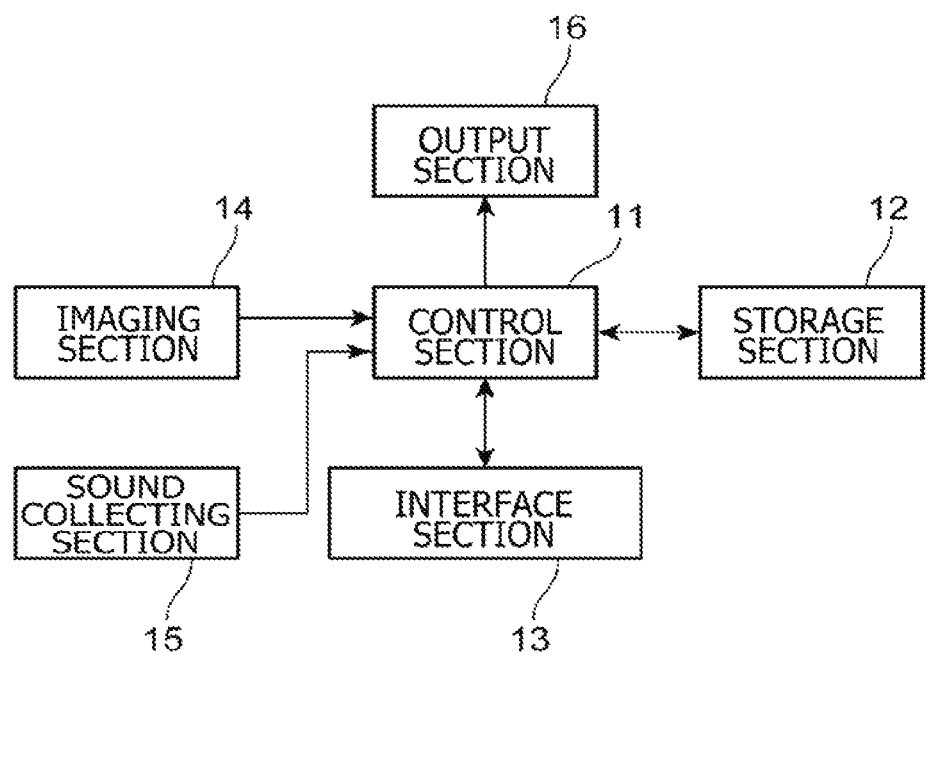
FIG. 3 is a configuration block diagram representing an example of an information processing apparatus according to the embodiment of the present invention.

The information processing apparatus 10, as exemplified in FIG. 3, includes a control section 11, a storage section 12, an interface section 13, an imaging section 14, a sound collecting section 15, and an output section 16. The control section 11 is a program-controlled device such as a CPU, and operates in accordance with a program stored in the storage section 12.

The storage section 12 is a memory device or the like, and holds therein the program which is to be executed by the control section 11. The program may be stored in a computer-readable and non-temporary storage media to be provided, and may be copied to the storage section 12. In addition, the storage section 12 operates also as a work memory of the control section 11.

The interface section 13 is connected to the controller device 20 in a wireless or wired manner. The interface section 13 receives the information representing the contents of the manipulation by the user from the controller device 20, and the information which is outputted from the sensor section 24, and outputs these pieces of information to the control section 11.

The imaging section 14 is a camera or the like which is installed with a range in which the user is located as an imaging range, and repetitively captures an image including the user image at each predetermined timing, and outputs the data associated with the corresponding image to the control section 11. The sound collecting section 15 is a section which realizes an example of means detecting a vibration state of the controller device 20 in the present invention. The sound collecting section 15 is a microphone, and collects sounds in the periphery in which the user is located and outputs the collected sounds in the form of a sound signal. The sound collecting section 15 collects the sound (the information representing the vibration state) which is generated when the controller device 20 vibrates.

The output section 16 has an interface for outputting a video image or the like to a consumer-use television, such as an HDMI (registered trademark) interface. The output section 16 outputs information associated with a video image to be displayed in accordance with an instruction inputted thereto from the control section 11.

In an example of the present embodiment, the control section 11 of the information processing apparatus 10 receives an instruction for the vibration for the controller device 20 from an application program of a game or the like to produce a control signal. This control signal, for example, similar to a sound signal, is waveform information representing a time change of a vibration amplitude. Since the widely known method can be used for such processing for producing the control signal, a detailed description thereof is omitted here. It should be noted that, in a case where the controller device 20 is provided with a plurality of vibration bodies 25, a control signal is produced in each of the vibration bodies 25. In addition, in a case where the different controller devices 20L and 20R are mounted in the left and right hands of the user, respectively, a control signal is produced in each of the vibration bodies 25 of the controller devices 20L and 20R.

The control section 11 holds the produced waveform information. In addition, the control section 21 decides whether or not the allophone is generated in the controller device 20 by using the sound signal collected in the sound collecting section 15. When it is decided that the allophone is generated in the controller device 20, the control section 21 executes the correction processing for the waveform information as the control signal held therein, and outputs the corrected waveform information as the control signal obtained through the correction in the corresponding correction processing. The control section 11, in terms of the function, as exemplified in FIG. 4, includes a waveform information inputting section 41, the decision section 42, a correction control section 43, a correction processing section 44, and an output section 45.

The waveform information inputting section 41 receives the input of the waveform information, as the control signal for the vibration body 25, which is produced by receiving the instruction for the vibration for the controller device 20 by the game application or the like.

While the vibration body 25 vibrates in the controller device 20 (in the case where there are a plurality of vibration bodies 25, while any of the vibration bodies 25 vibrates), the decision section 42 decides whether or not the allophone is generated in the controller device 20 by using the sound signal outputted from the sound collecting section 15. Specifically, the decision section 42 checks a change in sound volume of the sound signal outputted from the sound collecting section 15 while the vibration body 25 vibrates in the controller device 20. In a case where the change in sound volume fulfills a previously determined condition, the decision section 42 decides that an unintentional sound (allophone) is generated in the controller device 20.

Here, the previously determined condition, for example, is prescribed in such a way that the sound volume change is periodical or continuous, and the maximum sound volume exceeds a predetermined sound volume, that is, the previously determined condition corresponds to a sound volume change in sound which is generated when the chassis of the controller device 20 or an object such as a disk with which the chassis of the controller device 20 is in contact resonates experimentally with the vibration of the vibration body 25.

Figures 4, 5:
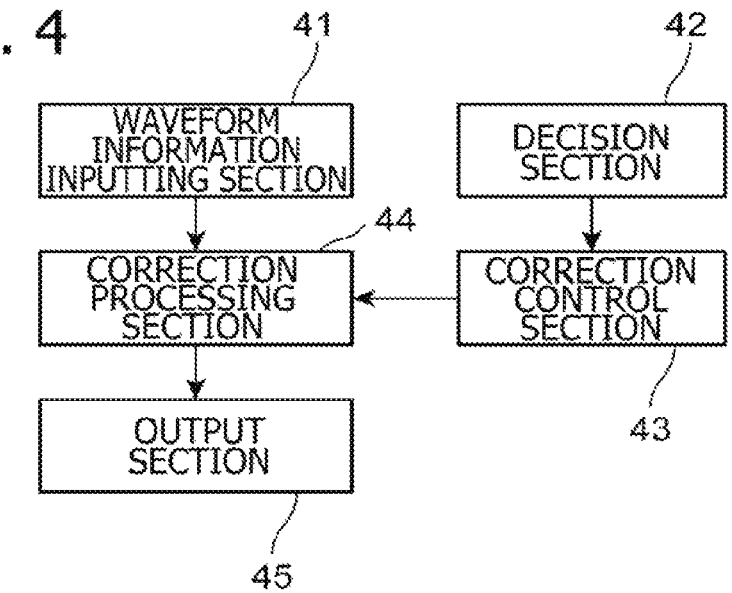
FIG. 4 is a functional block diagram representing an example of the information processing apparatus according to the embodiment of the present invention.
FIG. 5 is an explanatory diagram representing an example of a correction recording table which is held by the information processing apparatus according to the embodiment of the present invention.

The correction control section 43 stores a correction recording table exemplified in FIG. 5 in the storage section 12. With respect to information (vibration body identification information) used to specify each of the vibration bodies 25 for each of the controller devices 20 (for each of the controller devices 20 in a case where the controller devices 20 are mounted in the left and right hands. In addition, for each user in a case where a plurality of users use the controller devices 20 individually, more specifically, for each of the controller devices 20 communicating with the information processing apparatus 10), the correction recording table is a data table in which pieces of flag information representing any of the following items are recorded so as to be associated with one another.

no correction was performed for the control signal in the past (uncorrected), a trial as to whether or not the control signal is corrected is currently performed (in trial), a trial as to whether or not the correction of the control signal is performed is ended (end of trial), the control signal is currently corrected (in correction), and although the control signal was corrected in the past, no correction is currently performed (correction has been tried). It should be noted that the flag which is reset at the previously determined timing such as at the time of turn-ON of the power source of the information processing apparatus 10, or at the time of switching of the application program, and is associated with all the pieces of vibration body identification information is set as "uncorrected."

In addition, when the decision section 42 decides that the allophone is generated in the controller device 20, the correction control section 43 operates as follows. Specifically, the correction control section 43 specifies the vibration body 25 which vibrates at a time point when the decision section 42 decides that the allophone is generated. More specifically, the correction control section 43 decides which of the vibration bodies 25 outputs the control signal at that time point.

The correction control section 43 refers to the correction recording table, and if the correction recording table has the vibration body identification information associated with the flag information of "end of trial" at the time point when the decision section 42 decides that the allophone is generated, then, the correction control section 43 outputs an instruction to cancel the correction for the vibration body 25 specified with the vibration body identification information to the correction processing section 44. Moreover, the correction control section 43 changes the flag information associated with the vibration body identification information to "correction has been tried" to update the correction recording table.

The correction control section 43 refers to the correction recording table again, of the vibration bodies 25 specified as vibrating at the time point when the decision section 42 decides that the allophone is generated, extracts pieces of vibration body identification information associated with the flag information of "uncorrected." The vibration body identification information includes information used to specify the controller device 20 provided with the vibration body 25 of interest, and identification information associated with the vibration body 25 of interest in the controller device 20 specified by the information.

Then, the correction control section 43 starts correction trial processing. In the correction trial processing, the correction control section 43 selects one of the pieces of vibration body identification information extracted in order (in order determined by a previously determined method) (if the extracted vibration body identification information is only one piece, then, the vibration body identification information of interest is selected) to change the flag information stored in the correction recording table associated with the selected vibration body 25 to "in trial." Then, the correction control section 43 outputs the vibration body identification information thus selected together with an instruction of the effect that the correction should be performed to the correction processing section 44.

The correction control section 43 checks whether or not the decision section 42 decides that the allophone is still generated. If the decision section 42 does not decide that the allophone is generated in this stage, then, the correction control section 43 refers to the correction recording table and changes the flag information set to "in trial" at that time point to "in correction" to update the correction recording table. Then, the correction trial processing is ended.

On the other hand, if the decision section 42 decides that the allophone is still generated in this stage, then, the correction control section 43 refers to the correction recording table and executes next processing. Specifically, if the flag information set to "in trial" at the time point when the decision section 42 decides that the allophone is still generated is included in the correction recording table, then, the correction control section 43 outputs an instruction of the effect that the correction should be further performed for the vibration body 25 specified with the vibration body identification information associated with the flag information of interest to the correction processing section 44.

In addition, if the flag information set to "end of trial" at the time point when the decision section 42 decides that the allophone is still generated is included in the correction recording table, then, the correction control section 43 changes the flag information of interest to "correction has been tried" to update the correction recording table. In addition, the correction control section 43 outputs an instruction to cancel the correction for the vibration body 25 specified by the vibration body identification information associated with the flag information changed to "correction has been tried" to the correction processing section 44. Then, if, of the vibration body identification information formerly extracted, there are the pieces of unselected vibration body identification information, the correction control section 43 is returned to the processing for selecting one of the pieces of unselected vibration body identification information, and continues the processing.

In a case where, of the pieces of vibration body identification information formerly extracted, there is no unselected vibration body identification information, the correction control section 43 ends the correction trial processing. In this case, it may be impossible to prevent the generation of the allophone from being suppressed.

For example, at a predetermined timing such as at the time of turn-ON of the power source, the correction processing section 44 refers to the correction recording table and stores a list of the vibration body identification information associated with the flag of either "in correction" or "in trial" in the form of correction target vibration identification information.

In addition, when the correction processing section 44 receives an input of the vibration body identification information together with the instruction of the effect that the correction should be performed from the correction control section 43, the correction processing section 44 additionally writes the vibration body identification information of interest to a correction target vibration body identification information list. In addition, when the correction processing section 44 receives an input of the vibration body identification information together with the instruction of the effect that the correction should be canceled from the correction control section 43, the correction processing section 44 removes the vibration body identification information of interest from the correction target vibration body identification information list.

The correction processing section 44 receives an input of the control signal for each of the vibration bodies 25 from the waveform information inputting section 41. Then, the correction processing section 44 refers to this list and corrects the control signal for the vibration body 25 identified with the vibration body identification information included in the correction target vibration body identification information list by using a previously determined method, and outputs the control signal after the correction to the output section 45. In addition, the correction processing section 44 outputs the control signal for the vibration body 25 identified with the vibration body identification information which is not included in the list to the output section 45 as it is.

Specifically, the method of the correction performed by the correction processing section 44, for example, can be correction for attenuating an amplitude of a waveform represented by the waveform information which is the control signal.

When the correction processing section 44 receives an instruction of the effect that the correction should be further performed from the correction control section 43, the correction processing section 44 refers to the correction recording table and changes the flag of "in trial" to the flag of "end of trial."

In addition, in the description herein, in a case where the allophone may not be suppressed when one correction method is tried, the flag information is set to "end of trial," but the present embodiment is by no means limited thereto.

Specifically, a procedure may be adopted in which a plurality of correction methods different from one another is previously determined, whenever the correction processing section 44 receives an instruction of the effect that the correction should be performed from the correction control section 43, the correction is performed by using any of the plurality of correction methods previously determined.

In this example, when the correction processing section 44 receives the instruction of the effect that the correction should be further performed from the correction control section 43, the correction processing section 44 refers to the correction target vibration body identification information list and corrects the control signal for the vibration body 25 identified with the vibration body identification information included in this list by using a method different from any of the correction methods which have been tried so far, and outputs the correction signal after the correction to the output section 45.

A plurality of correction methods different from one another thus described, for example, may adopt a correction method of attenuating the amplitude of the waveform represented by the waveform information which is the control signal with attenuation factors different from one another. In this example, specifically, when the correction processing section 44 receives the instruction of the effect that the correction should be further performed for the control signal for the vibration body 25 in trial of the correction from the correction control section 43, the correction processing section 44 shall attenuate the amplitude of the waveform with a larger attenuation factor than any of the attenuation factors so far.

In addition, the plurality of correction methods different from one another may be different from one another in modes of correction, for example, a correction mode in which the attenuation factor for the amplitude of the waveform represented by the waveform information which is the control signal is made to differ, a correction mode in which a frequency is changed instead of correcting the amplitude, and the like.

Moreover, when the correction processing section 44 receives an instruction of the effect that the correction should be further performed from the correction control section 43, in a case where the correction processing section 44 has tried all the correction methods previously determined for the control signal for the vibration body 25 identified with the vibration body identification information included in the correction target vibration body identification information list, and thus it may be impossible to perform the correction by a method different from any of the correction methods performed so far, the correction processing section 44 refers to the correction recording table and changes the flag of "in trial" to the flag of "end of trial."

The output section 45 receives the input of the control signal for each of the vibration bodies 25. The control signal may include the control signal corrected by the correction processing section 44. The output section 45 sends these control signals together with the pieces of vibration body identification information used to identify the corresponding vibration bodies 25 for the corresponding controller devices 20.

Figure 6:
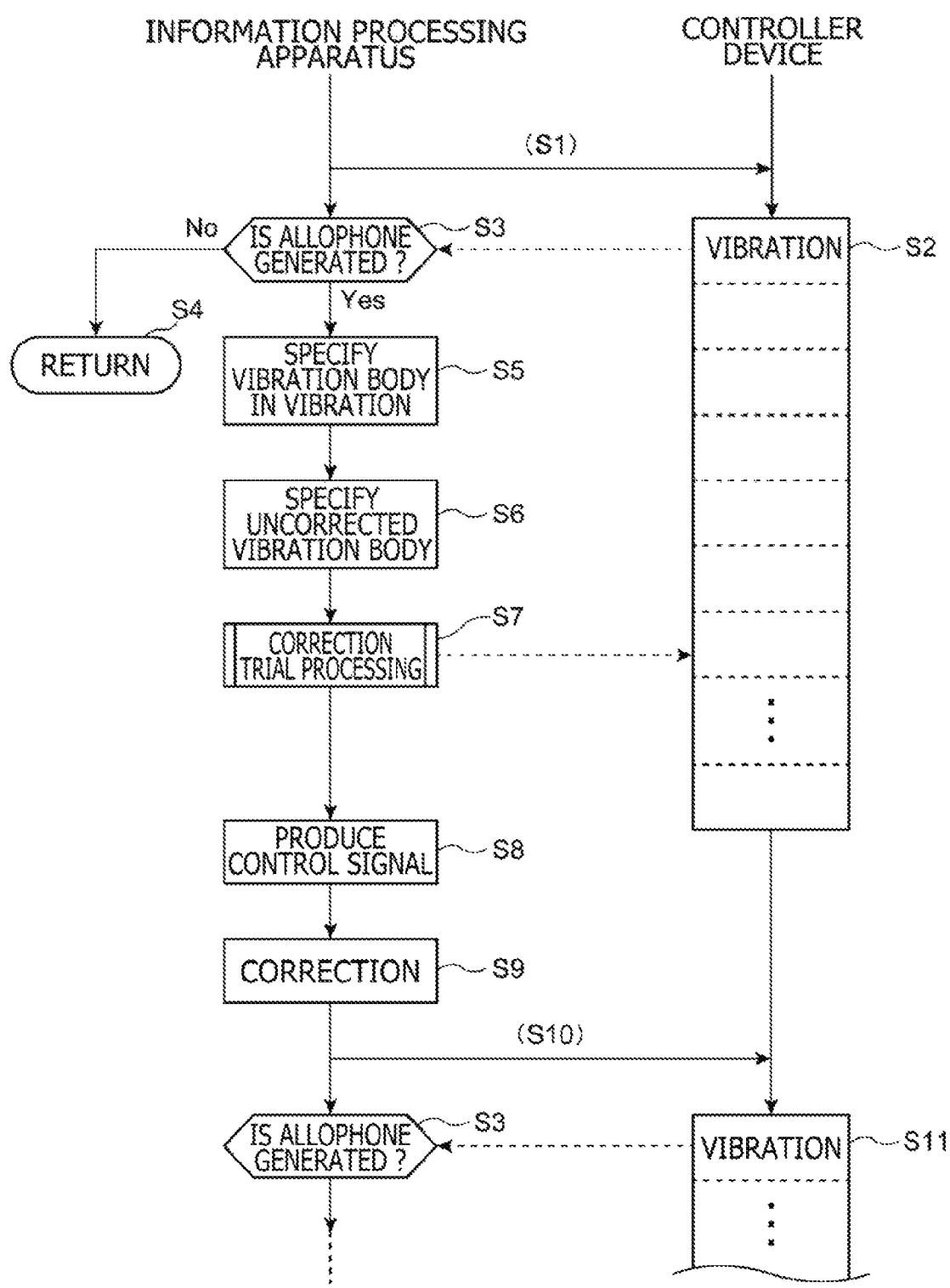
FIG. 6 is a flow chart representing an example of an operation of an information processing system according to the embodiment of the present invention.

[Operation] The embodiment, for example, has the configuration described above, and operates as follows. The information processing apparatus 10, as exemplified in FIG. 6, produces the control signal which causes the controller device 20 to be vibrated in accordance with an application program of a game or the like. Then, the information processing apparatus 10 initially sends the control signal to the controller device 20 as it is (S1). In this case, the control signal, for example, instructs the vibration for 0.5 second at longest. In a case where it is assumed that the vibration exceeding 0.5 second is instructed, a plurality of control signals are successively produced to be sent. In FIG. 6, this state is expressed by drawing a broken line between the vibration operations (S2, S11). The controller device 20 causes the vibration body 25 to vibrate in accordance with the waveform information of the control signal (S2).

The information processing apparatus 10 refers to the peripheral sound signal collected in the sound collecting section 15 while the vibration body 25 vibrates in the controller device 20 and decides whether or not the allophone is generated (S3).

Here, if it is decided that no allophone is generated (S3: No), then, the processing continues as it is (S4). Conversely, if it is decided in S3 that the allophone is generated (S3: Yes), then, the vibration body 25 which vibrates at the time point of the decision of interest is specified (S5).

Here, the information processing apparatus 10 refers to the correction recording table and retrieves the vibration body identification information associated with the flag information which is "in trial" at the time point when it is decoded that the allophone is generated. However, since the flag information is not initially set to the flag of "in trial," nothing is performed in this case.

The information processing apparatus 10 refers to the correction recording table and extracts, of the vibration bodies 25 specified as vibrating at the time when it is decided that the allophone is generated, the vibration body identification information associated with the flag information of "uncorrected" (S6). The information processing apparatus 10 starts correction trial processing (S7).

Figure 7:
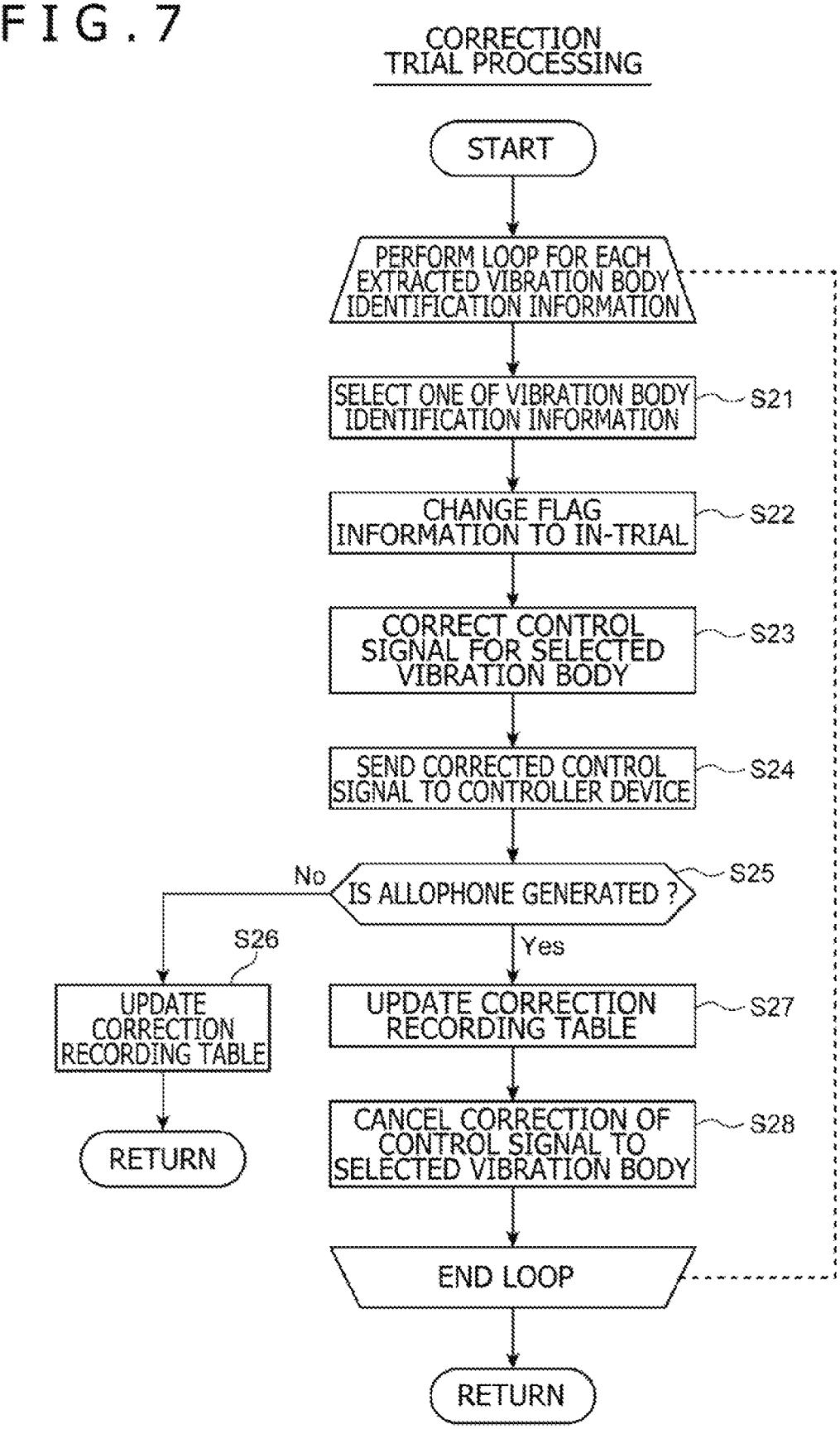
FIG. 7 is a flow chart representing an example of correction trial processing in the information processing system according to the embodiment of the present invention.

FIG. 7 exemplifies the correction trial processing. In the correction trial processing, the information processing apparatus 10 successively selects one of the pieces of vibration body identification information extracted in the processing S6 of FIG. 6 in a previously determined order (S21), and changes the flag information stored in the correction recording table so as to be associated with the selected vibration body 25 to the flag of "in trial." (S22)

The information processing apparatus 10 additionally writes the vibration body identification information selected in the processing S21 to the correction target vibration body identification information list. Then, of the produced control signals for the vibration bodies 25, the control signal for the vibration 25 identified with the vibration body identification information included in the correction target vibration body identification information list is corrected by using a predetermined method (S23), and sends the resulting control signal to the controller device 20 (S24). It should be noted that the control signal for the vibration body 25 identified with the vibration body identification information included in the correction target vibration body identification information list is not corrected, and is sent as it is.

As a result, the vibration body 25 identified with the vibration body identification information included in the correction target vibration body identification information list vibrates in accordance with the waveform information represented by the corrected control signal. By way of example, in a case where the correction in the processing S23 is the correction for attenuating the amplitude of the waveform represented by the waveform information, the vibration body 25 identified with the vibration body identification information included in the correction target vibration body identification information list shall vibrate with a strength which is more attenuated than a strength instructed by the game application or the like.

The information processing apparatus 10 refers to the peripheral sound signals collected by the sound collecting section 15 and decides whether or not the allophone is generated (S25). If it is not decided in this stage that the allophone is generated (S25: No), the information processing apparatus 10 refers to the correction recording table and changes the flag information set as "in trial" at that time point to the flag information of "in correction" to update the correction recording table (S26). Then, the correction trial processing is ended.

Conversely, when the information processing apparatus 10 decides in the processing S25 that the allophone is still generated (S25: Yes), the information processing apparatus 10 refers to the correction recording table and changes the flag information set as "in trial" at that time point to the flag of "end of trial" to update the correction recording table (S27). In addition, the correction for the vibration body 25 specified with the vibration body identification information associated with the flag information changed to the flag of "end of trial" is canceled (S28). In addition, the vibration body identification information is deleted from the correction target vibration body identification information list.

Then, if there are pieces of unselected vibration body identification information in the processing S21, then, the processing is returned to the processing S21. Thus, the information processing apparatus 10 is returned to the processing for selecting one of the pieces of unselected vibration body identification information to continuously execute the processing. In addition, if there is no unselected vibration body identification information in the processing S21, then, the correction trial processing is ended.

When the information processing apparatus 10 is returned from the correction trial processing and then, receives an instruction of the effect that the control signal for causing the controller device 20 to vibrate should be produced in execution of the game application program or the like, as exemplified in FIG. 6, the information processing apparatus 10 produces the control signal for causing the controller device 20 to vibrate (S8). Then, the information processing apparatus 10 corrects the control signal, for the vibration body 25 identified with the vibration body identification information included in the correction target vibration body identification information list of the produced control signal for the vibration body 25 by a predetermined method (S9). Then, the information processing apparatus 10 sends the control signal thus corrected to the controller device 20 (S10). It should be noted that the control signal, for the vibration body 25 identified with the vibration body identification information included in the correction target vibration body identification information list is sent as it is without being corrected.

As a result, in the controller device 20, the vibration body 25 identified with the vibration body identification information included in the correction target vibration body identification information list vibrates in accordance with the waveform information represented by the corrected control signal (S11). Hereinafter, the information processing apparatus 10 is returned to the processing S3 to continuously execute the processing.

[Decision by Frequency] In the description until now, the condition based on which the information processing apparatus 10 decides whether or not the allophone is generated is set as the condition in which the change in sound volume is periodical or continuous, and the maximum sound volume exceeds the predetermined sound volume, or the like. However, the present embodiment is by no means limited thereto.

For example, the information processing apparatus 10 may decide that the allophone is generated under a condition in which a sound at a previously determined frequency exceeds a predetermined sound volume instead of the condition described above or together with the condition described above. The frequency, for example, is previously determined as a natural frequency or the like of a member may vibrate in the controller device 20, such as a chassis of the vibration body 25 in vibration or a chassis of the controller device 20.

[Allophone by Hitting of Weight] Further, the cause of generating the allophone is by no means limited to the case where a member which may vibrate in the controller device 20 or an object with which the controller device 20 is in contact resonates with the controller device 20.

In the vibration body 25 such as the linear actuator, when the controller device 20 is inclined, the weight which is movable inside is previously gravitated before vibration to be biased to one side within the chassis, in some cases. If the vibration control is performed at this time, depending on a movement amount of the weight, the weight hits an inner wall of the chassis of the vibration body 25 (so-called "mechanical hitting"), and the periodic metallic sound of "ticktock . . . " is generated, in some cases. Such a metallic sound is an unintentional sound and becomes the allophone.

Figure 8:
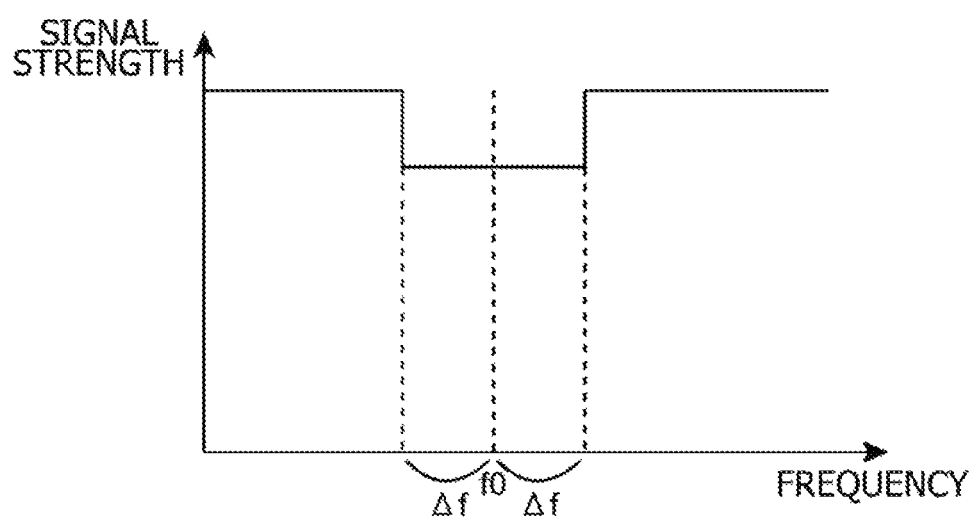
FIG. 8 is an explanatory view representing an example of contents of correction which is performed by the information processing apparatus according to the embodiment of the present invention.

In such a case, the vibration in the vicinity of the natural frequency (the natural frequency of the mechanism itself for vibrating the weight) of the linear actuator itself becomes excessive, so that the weight hits the inner wall of the chassis of the vibration body 25, in some cases. Then, against the allophone of this case, instead of performing the correction for attenuating the amplitude in the manner as described above, it is suitable to perform correction for attenuating (as exemplified in FIG. 8, performing the band attenuation filtering) a component in the vicinity of the natural frequency f0 (band of f0±Δf) of the waveform represented by the waveform information which is the control signal. Here, an attenuation amount of the band in the vicinity of f0 of interest may not be a value near 100%, but it is only necessary that the attenuation amount is determined empirically.

Then, in order to deal with this case, when the decision section 42 decides whether or not the allophone is generated in the controller device 20, together with the condition about the allophone generated by the resonance described above (a first condition), a condition about the allophone generated by the mechanical hitting, as to whether or not the periodical metallic sound of "ticktock . . . " is generated (whether or not the waveform signal of interest is included in the sound signals collected in the sound collecting section 15) (second condition) is used.

Then, the decision section 42 in this case outputs information representing whether or not the sound signal collected in the sound collecting section 15 is fulfilled the first condition, and information representing whether or not the second condition is fulfilled.

When the decision section 42 outputs either the information representing that the first condition is fulfilled or the information representing that the second condition is fulfilled, the decision section 42 decides that the allophone is generated in the controller device 20.

Then, when the flag information stored in any of the correction recording tables is changed to the flag of "in trial," the correction control section 43 of this case causes information representing whether the information outputted from the decision section 42 is the information representing that the first condition is fulfilled, or the information representing that the second condition is fulfilled to be included in the flag information of interest. In other words, the correction control section 43 causes the information representing whether the allophone due to the resonance is generated, or the allophone due to the mechanical hitting is generated to be included in the flag information.

Moreover, the correction control section 43 changes the flag information set as "in trial" to the flag of "in correction." Then, even when the correction recording table is updated, the correction control section 43 causes information representing whether the information outputted from the decision section 42 is the information representing that the first condition is fulfilled, or the information representing that the second condition is fulfilled to be included in the flag information of "in correction." In other word, the correction control section 43 shall cause the information representing whether the allophone due to the resonance is generated, or the allophone due to the mechanical hitting is generated to be included in the flag information of "in correction."

When the correction is performed, the correction processing section 44 refers to the flag information stored in the correction recording table so as to be associated with the vibration body identification information of the vibration body 25 becoming a target to be corrected, and reads out the information representing whether the allophone due to the resonance is generated, or the allophone due to the mechanical hitting is generated. Then, with respect to the control signal for the vibration body 25 of the vibration body identification information associated with the information representing that the allophone due to the resonance is generated, as previously stated, the correction processing section 44 performs the correction for attenuating the amplitude of the waveform represented by the waveform information which is the control signal.

In addition, with respect to the control signal for the vibration body 25 of the vibration body identification information associated with the information representing that the allophone due to the mechanical hitting is generated, it is suitable to perform the correction for attenuating the component in the vicinity of the natural frequency f0 (the band attenuation filtering is performed for the signal having a frequency in the vicinity of f0). Since the widely known signal processing method can be adopted for the processing for attenuating the predetermined band, a detailed description thereof is omitted here.

According to this example, with respect to the control signal for the vibration body 25 causing the allophone due to the resonance to be generated, for suppressing the resonance, the correction for attenuating the amplitude is generated. In addition, with respect to the control signal for the vibration body 25 causing the allophone due to the mechanical hitting to be generated, the correction for attenuating the band in the vicinity of the natural frequency is performed. In other words, the corrections corresponding to the causes of generation of the respective allophones shall be performed.

[Decision of Generation Position of Allophone] In addition, in a case where the controller device 20 is provided with a plurality of vibration bodies 25, or in a case where there are a plurality of controller devices 20, the control section 11 of the information processing apparatus 10, as the processing in the decision section 42, may decide whether or not the allophone is generated in any of the controller devices 20, and may estimate a position of a generation source of the allophone. This estimation, for example, is performed as follows.

More specifically, in this example, the sound collecting section 15 of the information processing apparatus 10 is provided with a plurality of microphones which are arranged in positions previously determined so as to be separated from one another. Then, based on a ratio of the allophone included in the sound signal collected by each of the microphones, a distance between each of the microphones, and the generation source of the allophone is estimated.

Thus, the position of the controller device 20 in which the allophone is generated, or the position of the vibration body 25 within the controller device 20 of interest is determined from the information associated with the plurality of distances. Since such processing of the position determination can use the widely known analysis processing for the sound signal, the detailed description thereof is omitted here.

In addition, a position of the controller device 20 with respect to each of the microphones of the sound collecting section 15 may be decided based on the image captured by the imaging section 14. In this case, each of the microphones included in the sound collecting section 15 may include a light emitting element which emits light within a predetermined color or pattern such that a position thereof can be recognized.

Then, in this example, when the information processing apparatus 10 executes the correction trial processing in the correction control section 43, it is configured that an order of selecting the vibration body identification information serving as the target of the trial of the correction one by one is an order in which the vibration body 25 specified by the vibration body identification information serving as the target of the trial of the correction is closer to the estimated position described above. As a result, the correction can be relatively speedily performed.

[Learning] In addition, in the description so far, the vibration is once started, and the vibration is corrected when the generation of the allophone is detected; however, the present embodiment is by no means limited thereto.

The control section 11 of the information processing apparatus 10 of the present embodiment may associate a condition when the allophone was generated in vibration of the vibration body 25 in the past (allophone generation condition) with situation information of the correction for suppressing the allophone at that time (information representing how the control signal is corrected for which vibration body 25) to be stored. Then, when the control section 11 becomes a situation in which any of the conditions stored is fulfilled, the control section 11 acquires the situation information of the correction associated with the fulfilled condition. The control section 11 corrects the control signal which is to be sent to each of the vibration bodies 25 represented by the situation information of the correction thus acquired with the contents of the corresponding correction represented by the situation information of the correction.

Specifically, an example of the allophone generation condition in this case includes the condition based on the information of the posture of the controller device 20. In this case, the information processing apparatus 10 accumulates and stores the rotational angles $(\theta, \varnothing, \psi)$ about the X, Y and Z axes which were detected by the inclination sensor 241 of the controller device 20 (the controller device 20 provided with the vibration body 25 in which the allophone was suppressed by the correction) as the generation source of the allophone when the allophone due to the mechanical hitting was generated in the past, and the vibration body identification information representing the vibration body 25 which generated the allophone at that time so as to be associated with each other.

The information processing apparatus 10 classifies the accumulated and stored information by the vibration body identification information included in the accumulated and stored information, i.e., by $\theta$, $\varphi$, $\psi$ associated with the vibration body identification information, into bins, for each one degree, for example, to check an appearance frequency (production of a histogram). Then, the information processing apparatus 10 specifies the bins of $\theta$, $\varphi$ and $\psi$ each of the appearance frequencies of which exceeds a predetermined threshold value (for example, a value obtained by multiplying the number N of pieces of information accumulated and stored by a predetermined ratio r) of the appearance frequencies of θ, φ, ψ for each vibration body identification information. Then, the bin of θ, the bin of φ, and the bin of ψ which are specified for each vibration body identification information are stored as the information of the angles (allophone generation angle information) at which the generation of the allophone is predicted in the vibration body 25 identified with the vibration body identification information of interest.

In vibrating the vibration body 25, the information processing apparatus 10 acquires the rotational angles (θ, φ, ψ) about the X, Y and Z axes, which are detected by the inclination sensor 241, as the information of the posture of the controller device 20 at that time. The information processing apparatus 10 decides whether or not the acquired rotational angles θ, φ, ψ described above are included in the respective bins represented by the information of the allophone generation angles associated with the vibration body identification information of the vibration body 25 which is tried to be vibrated. Here, when all θ, φ, ψ are included in the respective bins representing the allophone generation angle information associated with the vibration body identification information of the vibration body 25 which is tried to be vibrated, then, the information processing apparatus 10 predicts that the allophone will be generated in the vibration body 25 identified with the vibration body identification information of interest, and corrects the control signal for the vibration body 25 of interest by using a predetermined method. In this case, since the allophone generation condition is set as the posture of the controller device 20 (the condition under which the allophone per mechanical hitting is generated), the correction in this case, as described above, is set as the correction for attenuating the frequency band in the vicinity of the natural frequency of the vibration body 25 in which it is predicted that the allophone will be generated.

In addition, the allophone generation condition is by no means limited to the above one, and the allophone generation condition may be set as the grip, detected by the grip sensor 243, with which the controller device 20 is griped. Since in this example, it is considered that a resonance frequency of the controller device 20 is shifted, when it is predicted that the allophone due to the vibration of any of the vibration bodies 25 will be generated in response to the grip, the correction for attenuating the amplitude of the waveform information which is the control signal for the vibration body 25 of interest is performed.

The information processing apparatus 10 of the present embodiment may use the processing of the correction by the prediction in combination with the processing of deciding whether or not the correction is performed after the vibration body 25 is caused to vibrate once, which is previously described.

[Another Example of Detection of Vibration State] In addition, in the description so far, the detection of the allophone is performed in the sound collecting section 15; however, the present embodiment is by no means limited thereto. For example, in a case where an acceleration different from the vibration applied to the controller device 20 is detected from the waveform information which is the control signal for the vibration body 25 by using the acceleration sensor 242 (for example, in a case where a shock is periodically detected), it may be decided that the allophone is generated.

[Modified Examples] In addition, in the description so far, the decision as to whether or not the allophone is generated or the operation for processing of the correction is performed in the information processing apparatus 10; however, the present embodiment is by no means limited hereto. Specifically, in a case the controller device 20 is provided with sound collecting means such as a microphone, the control section 21 of the controller device 20 may perform the operation as the decision section 42. In this case, the controller device 20 may send the result of the decision of interest to the information processing apparatus 10.

In other words, in the present embodiment, one of the information processing apparatus 10 or the controller device 20 functions as sound collecting means collecting the peripheral sounds in vibration of the vibration body, and decision means deciding whether or not the allophone is generated in the controller device by using the signal of the collected sound.

Moreover, in the present embodiment, the control section 21 of the controller device 20 may perform the operations as the correction control section 43 and the correction processing section 44.

[Another Example of Correction Control] It should be noted that, in present the embodiment, in a case where there are a plurality of vibration bodies 25, the trial of the correction may be performed by combination of the methods of correction for the plurality of vibration bodies, and the control may be performed so as to find out the combination with which the allophone is most attenuated.

With respect to such a method for the correction, there are considered a method in which while the vibration bodies 25 are successively selected, a correction method with which the allophone due to the vibration of the vibration body 25 becomes smallest is detected, and the correction is performed by using this correction method (even in the case where the allophone is not eliminated, of the tried correction methods, the correction of the correction method with which the allophone becomes smallest is continuously performed), and the like.

In addition, from the past correction examples, the allophone generation condition, and the situation information of the correction of each of the vibration bodies 25 depending on a feature amount of the allophone being generated (the information or the like associated with the amplitude and the place where the allophone is generated) may be mechanically learned in advance. Then, by using the result of the mechanical learning, the correction method for each of the vibration bodies 25 for dealing with the detected allophone may be decided.

[In Case Where There Are Plurality of Controller Devices] Moreover, in a case where one user uses a plurality of controller devices 20, the following processing may be executed.

More specifically, in a case where, of a plurality of controller devices 20a, 20b, . . . each of which is used by the one user, the trial of the correction is performed for the controller device 20a in which the allophone is generated, and as a result, the generation of the allophone is not suppressed, an instruction of the vibration which is essentially outputted to the controller device 20a is included in an instruction of the vibration which is outputted to at least some of the other controller devices 20b . . . which are used by the user of interest. More specifically, if the control signal is the waveform information representing the time change of the vibration amplitude, then, for a waveform Vb'(t) represented by the waveform information outputted to the controller device 20b, a waveform Vb(t) represented by the waveform information which is essentially outputted to the controller device 20b is synthesized with a waveform Va(t) represented by the waveform information which is essentially outputted to the controller device 20a to obtain Vb'(t)=Vb(t)+Va(t). Here, t represents time, and V(t) represents the amplitude of the waveform. At this time, the control is performed in such a way that no waveform information is outputted to the controller device 20a.

Alternatively, as another method, a waveform Va'(t) represented by the waveform information which is outputted to the controller device 20a in which the generation of the allophone was not suppressed is obtained by attenuating the Va(t) represented by the waveform information which is essentially outputted to the controller device 20a, and thus Va'(t)=α·Va(t) may be set (however, −1<α<1, here, in a case where a is negative, this case corresponds to a case in which a waveform is the opposite phase of the waveform which is essentially outputted). At this time as well, for the waveform Vb'(t) represented by the waveform information outputted to the controller device 20b, the waveform Vb(t) represented by the waveform information which is essentially outputted to the controller device 20b may be synthesized with the waveform Va(t) represented by the waveform information which is essentially outputted to the controller device 20a to obtain Vb'(t)=Vb(t)+Va(t) or obtain Vb'(t)=Vb(t)+β·Va(t) by using −1<β<1. Here, β may be decided in such a way that |β|=1−|α| is obtained. It should be noted that |x| means an absolute value of x.

[Correction by Instruction from User] In addition, in the description so far, when the generation of the allophone is detected, the correction is tried; however, the trial processing for the correction may be executed by the explicit instruction from the user.

In this case, the correction control section 43 starts correction trial processing in response to the instruction from the user, and tries the correction while the controller device 20 is caused to vibrate by using a previously determined vibration instruction. In this example, a method of grasping the controller device 20 may be guided to the user. Specifically, a guidance (image or character string) that "please, grasp horizontally the controller" may be shown to the user before the correction is tried.

In addition, in this example, the correction control section 43 may repetitively execute the processing for trying the correction while guiding various kinds of grasping methods for the controller device 20 to the user. As a result, for example, the situation of the generation of the allophone depending on the posture of the controller device 20, and the correction method capable of suppressing the allophone can be leaned.

[Instruction not to Perform Correction] In addition, an instruction as to whether or not the correction is performed may be previously received from the user. In this case, when there is an instruction not to perform correction, either the control section 11 or the control section 21 for executing the correction trial processing or the correction processing controls such that the trial processing for the correction, or the processing for the correction is not executed.

REFERENCE SIGNS LIST

10 . . . Information processing apparatus, 11 . . . Control section, 12 . . . Storage section, 13 . . . Interface section, 14 . . . Imaging section, 15 . . . Sound collecting section, 16 . . . Output section, 20 . . . Controller device, 21 . . . Control section, 22 . . . Storage section, 23 . . . Manipulation interface, 24 . . . Sensor section, 25 . . . Vibration body, 26 . . . Communication section, 41 . . . Waveform information inputting section, 42 . . . Decision section, 43 . . . Correction control section, 44 . . . Correction processing section, 45 . . . Output section, 210 . . . Device main body, 211 . . . Grip section, 212 . . . Manipulation section, 213 . . . Position processing section, 220 . . . Fixture, 231 . . . Button manipulation section, 241 . . . Inclination sensor, 242 . . . Acceleration sensor, 243 . . . Grip sensor

The invention claimed is:

1. An information processing system including a controller device including at least one vibration body, and an information processing apparatus outputting a control signal for the at least one vibration body to the controller device, the information processing system comprising:
   detection means detecting a vibration state of the controller device in vibration of the at least one vibration body; and
   decision means deciding whether or not an allophone is generated in the controller device by using information representing the detected vibration state,
   wherein, when it is decided that the allophone is generated in the controller device, the information processing apparatus executes correction processing for the control signal for the at least one vibration body, and outputs a control signal corrected by the correction processing.

2. The information processing system according to claim 1, wherein
   the detection means collects sounds of a periphery of the controller device as information representing the vibration state of the controller device, and
   when a signal at a previously determined frequency is included in a signal of the collected sound, the decision means decides that the allophone is generated in the controller device.

3. The information processing system according to claim 1, wherein
   the controller device includes a plurality of vibration bodies,
   the decision means decides whether or not the allophone is generated in the controller device, and estimates a position of a generation source of the allophone, and
   while the decision means decides that the allophone is generated, the information processing apparatus successively selects any of the plurality of vibration bodies of the controller device in an order closer to the estimated position, and executes correction processing for a control signal which is outputted to a selected vibration body.

4. The information processing system according to claim 1, wherein, when the decision means decides that the allophone is generated after the corrected control signal is outputted, the information processing apparatus cancels the correction processing for the control signal.

5. The information processing system according to claim 1, wherein, at a time of output of the control signal, the information processing apparatus predicts whether or not the allophone is generated due to the outputted control signal based on information associated with a posture of the controller device when the allophone was generated in vibration of the vibration body in the past, and when it is predicted that the allophone is generated, corrects the control signal for the vibration body, and outputs the corrected control signal.

6. A vibration control method of using a computer outputting a control signal for at least one vibration body to a controller device including the at least one vibration body, the vibration control method comprising:

receiving a result of decision as to whether or not an allophone is generated in the controller device by using information representing a state of vibration of the at least one vibration body; and executing correction processing for a control signal for the at least one vibration body when it is decided that the allophone is generated in the controller device, and outputs the control signal corrected by the correction processing.

7. A non-transitory, computer-readable storage medium containing a computer program, which when executed by a computer, causes the computer to output a control signal for at least one vibration body to a controller device including the at least one vibration body, and to carry out actions, comprising:

receiving a result of decision as to whether or not an allophone is generated in the controller device by information which represents a vibration state of the controller device, and is acquired in vibration of the at least one vibration body; and executing correction processing for the control signal for the at least one vibration body when it is decided that the allophone is generated in the controller device, and outputting the control signal obtained through a correction by the correction processing.

\* \* \* \* \*